United States Patent Office 3,573,219
Patented Mar. 30, 1971

3,573,219
METHOD OF TREATING A LIQUID
SCINTILLATOR COMPOSITION
Royal H. Benson, Texas City, Tex., assignor to
Monsanto Company, St. Louis, Mo.
No Drawing. Filed May 7, 1969, Ser. No. 822,742
Int. Cl. G01t 1/20; C09k 1/02
U.S. Cl. 252—301.2
30 Claims

ABSTRACT OF THE DISCLOSURE

A method for treating a liquid scintillator composition or the liquid vehicle used therein, said vehicle comprised of a hydrocarbon solvent, and an ethoxylated alkyl phenol, said composition comprised of said liquid vehicle and a scintillation solute comprising contacting said vehicle or composition with a basic treating agent for a time sufficient to reduce chemiluminescence to a level acceptable for the counting of basic samples.

BACKGROUND OF THE INVENTION

The present invention relates to liquid scintillation counting. More particularly, the present invention relates to a method for treating a liquid scintillator composition or the liquid vehicle used therein so as to render the composition suitable for the counting of basic materials.

In recent years, liquid scintillation counting has become a very popular method for the measurement of low-energy beta emitters such ac $C^{14}$, $S^{35}$ and $H^3$. Briefly, liquid scintillation counting is accomplished by combining the radioactive sample to be analyzed with a liquid scintillator so as to form a counting sample. The radiation from the sample excites the liquid scintillator causing the emission of scintillation light pulses which are proportional to the radioactivity of the sampe. These light pulses are then "counted" by use of suitable equipment. The liquid scintillators useful in liquid scintillation counting generally comprises a solvent portion i.e., a liquid vehicle, and a solute portion. The solute portion will hereafter be referred to as scintillation solute and may be comprised of a primary solute as well as other components such as a secondary solute. The secondary solute usually is a waveband shifter used to achieve a more desirable wavelength of the scintillation light pulses. The primary solute is generally referred to as a fluor and it will so be referred to hereafter. The most widely used solvents or liquid vehicles for liquid scintillation counting are the alkyl benzenes such as toluene, xylene, ethylbenzene and the like. However, one of the major drawbacks for the use of the alkylbenzene solvents is that they do not permit the counting of aqueous samples in a homogeneous medium. As a result, other phosphors have been developed such as mixtures of ethanol and toluene which permit the counting of aqueous samples in homogeneous solution.

Even though some prior art liquid scintillators permit the counting of aqueous samples, they suffer the disadvantage that they do not permit the measurement of counting samples containing high percentages of water. This is due to the decrease in counting efficiency which occurs as the water concentration of the counting sample is increased brought on by the fact that only small percentages of water may be dissolved or suspended homogeneously.

In copending application Ser. No. 720,451 are described novel liquid scintillator compositions suitable for the counting of aqueous samples which substantially overcome all of the difficulties encountered with prior art compositions used to count such samples. While the compositions described in the above-identified application are excellent for counting non-aqueous as well as aqueous samples, it has been found that the compositions are subject to a chemiluminescent reaction whenever they are used for the radioactive assay of basic materials. The chemiluminescent reaction, which occurs when the scintillator compositions are mixed with basic samples, has a relatively long half-life necessitating a considerable delay between the time the basic sample is added and the time the measurement can be carried out without interference. This problem is especially serious in the radioactive assay of basic samples containing tritium and other low-energy radioactive isotopes. In these cases, it has been found that periods of up to five days are required for the chemiluminescene to decay to an acceptable background level whereby accurate measurements can be made.

SUMMARY OF THE INVENTION

It is an object of the present invention to provide a method for treating a liquid vehicle used to prepare liquid scintillator compositions whereby said composition is rendered suitable for the radioactive assay of basic materials.

It is also an object of the present invention to provide a method for treating a liquid scintillator counting composition whereby said composition is rendered suitable for the radioactive assey of basis materials.

It is a further object of the present invention to provide a method for the treatment of a liquid scintillation counting composition whereby said composition can be used to accurately count basis materials containing low-energy radioactive isotopes such as tritium.

Additional objects will become apparent from the following description of the present invention and the appended claims.

In one of its embodiments, the present invention is a method for treating a liquid vehicle used in preparing liquid scintillator compositions comprising contacting a liquid vehicle comprised of an aromatic hydrocarbon and an ethoxylated alkyl phenol wherein the alkyl substituent contains from 7 to 16 carbon atoms and the ratio of the number of carbon atoms in said alkyl substituent to the average number of ethoxy groups in said ethoxylated alkyl phenol is from 0.83 to 1.67, with an effective amount of a treating agent selected from the group consisting of basic ion-exchange resins, alkali metal carbonates, alkali metal bicarbonates, ammonium hydroxide and mixtures thereof, said contacting being carried out for a period of time sufficient to reduce the chemiluminescence to an acceptable background level when a basic material is added to a liquid scintillator composition prepared from said liquid vehicle.

The present invention, in another of its embodiments, is a method for treating a liquid scintillator composition comprising contacting a composition comprised of an aromatic hydrocarbon, a scintillation solute and an ethoxylated alkyl phenol wherein the alkyl substituent contains from 7 to 16 carbon atoms and the ratio of the number of carbon atoms in said alkyl substituent to the average number of ethoxy groups in said ethoxylated alkyl phenol is from 0.83 to 1.67, with an effective amount of a treating agent selected from the group consisting of basic ion-exchange resins, alkali metal carbonates, alkali metal bicarbonates, ammonium hydroxide and mixtures thereof, said contacting being carried out for a period of time sufficient to reduce the chemiluminescence to an acceptable level when a basic material is added to said composition.

DESCRIPTION OF THE PREFERRED EMBODIMENTS

The liquid scintillation counting compositions treated by the method of the instant invention are those described in the above-identified copending application. In general, those compositions are comprised of an aromatic hydrocarbon solvent and certain ethoxylated alkyl phenols which together comprise the liquid vehicle and a scintillation solute. According to the present invention, one can treat the liquid vehicle portion of the liquid scintillator compositions alone or one can treat the entire liquid scintillator composition, the latter, of course, being comprised of the liquid vehicle plus the scintillation solute.

The ethoxylated alkyl phenols used in the liquid vehicles or compositions treated by the method of the present invention can be depicted structurally as follows:

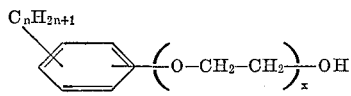

wherein $n$ is from 7 to 16 and $x$ represents the average number of ethylene oxide groups per molecule. The value of $x$ will, of course, vary depending on the number of carbon atoms in the alkyl substituent. In general, however, the value of $x$ will be such that the value of $n/x$ will be from 0.83 to 1.67. Examples of suitable ethoxylated alkyl phenols and preferred ranges of $n/x$ include ethoxylated heptyl phenol having a range of from 0.83 to 1.08, ethoxylated octyl phenol having a range of from 0.83 to 1.11, ethoxylated nonyl phenol having a range of from 0.89 to 1.11, ethoxylated decyl phenol having a range of from 0.90 to 1.17, ethoxylated hendecyl phenol having a range of from 0.93 to 1.22, ethoxylated dodecyl phenol having a range of from 0.93 to 1.27, ethoxylated tridecyl phenol having a range of from 0.97 to 1.34, ethoxylated tetradecyl phenol having a range of from 1.08 to 1.55, ethoxylated pentadecyl phenol having a range of from 1.15 to 1.67 and ethoxylated hexadecyl phenol having a range of from 1.33 to 1.51. As above stated, $x$ represents an average number of ethoxy groups per molecule. Thus, for example, when speaking of an ethoxylated alkyl phenol having 10.0 ethoxy groups, there will be present molecules having both more and less than 10 ethoxy groups.

The ethoxylated alkyl phenols as well as methods for their preparation are well known. Usually, the ethoxylated alkyl phenols are prepared by condensing ethylene oxide with the desired alkylated phenol. It is generally preferred for the ethoxylated alkyl phenols of the present invention to be comprised mainly, that is, above 50% of the para form. However, it is especially preferred to use those where at least 80% of the ethoxylated alkyl phenol is in the para form with the remainder being substantially comprised of the ortho form.

The solvents used in the liquid vehicles and compositions treated by the method of the present invention are the liquid aromatic hydrocarbons. Non-limiting examples of the latter include benzene, toluene, o-, m-, p-xylenes and mixtures thereof, cumene, the ethyl-benzenes and mesitylene. In particular, xylene, toluene and ethylbenzene have been found to give the highest counting efficiency. Especially preferred solvents are the xylenes, i.e., the ortho, meta or para isomers either alone or mixed. The volume ratio of solvent to the ethoxylated alkyl phenol useful in the vehicles or compositions of the present invention will generally be from 3:1 to 1:1. The ratio used will be determined by the sample stability requirements, the temperature at which the samples are measured, the counting efficiency requirements and the percentage of sample desired to be measured. The most useful ratios of solvent to ethoxylated alkyl phenol range from 2.4:1 to 1.6:1.

The scintillation solutes of the liquid scintillator compositions treated by the method of the present invention are those which are well known in the art. These scintillation solutes may be comprised of only a fluor or may also contain a secondary solute such as a spectrum shifter or wave-band shifter. The scintillation solute may also contain, for some purposes, a neutron-capture solute or a gamma-capture solute. Some of the more well-known fluors which are useful in the compositions treated by the present invention are those selected from the group consisting of p-terphenyl, the oxazoles and the oxadiazoles. Probably, the best known oxadiazole fluor is PBD [2-(4-biphenyl-5-phenyl-1,3,4-oxadiazole] and the most well-known oxazole fluor is PPO [2,5-diphenyloxazole]. Some of the better known secondary solutes which may be combined with the foregoing primary solutes are POPOP [1,4-bis-2-(5-phenyloxazolyl) - benzene], alpha - NOPON [p-bis-2-(5-1-naphthyloxazolyl) - benzene], DPH [1,6-diphenyl - 1,3,5 - hexatriene], and alpha-NPO [2-(1-naphthyl)-5-phenyloxazole] and MSB [p-bis-(o-methylstyryl)-benzene]. Another scintillation solute which has been mentioned in the prior art is m-terphenyl plus 0.5% anthracene. The scintillation solutes need only be present in amounts sufficient to enable the compositions to be useful as liquid scintillators. The optimum amount will vary according to the particular component or components making up the scintillation solute and the amount will generally be a balance between cost, solubility and performance requirements. The scintillation solute will generally be present in amounts of from 0.5 to 50 grams per liter but more often will be present in amounts from 1 to 12 grams per liter. It is especially preferred that the liquid scintillators treated by the method of the present invention contain about 4 to 6 grams per liter of scintillation solute. When speaking of only primary solutes or fluors, these are generally present in amounts of about 0.5 to 12 grams per liter. Secondary solutes are generally present in relatively small amounts as compared to the fluors, that is, from about 0.05 to 3 grams per liter. The preferred scintillation solute of the present invention is comprised of PPO and MSB.

The treating method of the present invention is accomplished by intimately contacting the liquid vehicle or the scintillator compositions with particular basic treating agents, which are either liquid or solid, for a period of time such that the chemiluminescene observed when a basic material is added to the scintillator compositions is reduced to an acceptable level. The term "acceptable level" as used herein refers to a background counting rate, generally expressed as counts per second, which is of such a value that it has a negligible effect on the accuracy of the measurement being made. For example, the scintillator compositions treated herein generally posses a background level of 1.20 counts/second which is obtained if a sample of non-radioactive distilled water is counted. In general, acceptable level may be defined as a background counting level of no greater than 2 counts/second when low energy radioactive isotopes, e.g., tritium, are present and 0.8 counts/second when higher energy radioactive isotopes, e.g., carbon [14], are present. The contact time required to obtain a certain acceptable background level is dependent on many factors such as: surface area of the treating agent, when a solid is employed; amount of treating agent present; initial level of chemiluminescence; etc.

One class of treating agents which has been found effective are the basic ion-exchange resins including strong-base resins such as those containing quaternary ammonium groups, sulfonium groups, phosphonium groups and the like, intermediate base resins such as those containing mixed tertiary amine and quarternary ammonium groups and weak-base resins such as those containing primary, secondary and tertiary amine groups and mixed primary, secondary and tertiary amine groups. The basic ion- exchange resins are generally prepared by first forming an insoluble, infusible polymer matrix into which active basic groups can be introduced by appropriate chemical action. However, a few resins are made by a one-step condensation. The preferred ion-exchange resins which are known as anion exchange resins have a matrix of cross-linked polystyrene such as a copolymer of a major proportion of styrene and a minor proportion of divinylbenzene and/or ethylvinylbenzene. Compounds such as isoprene or butadiene may also be used as cross-linking agents. Such a cross-linked polystyrene matrix may be converted to a strong basic exchange resin by chloromethylation and amination. Also, many anion exchange resins are based upon matrices which are phenol-formaldehyde condensates.

The anion exchange resins useful in the present invention may be various sizes and shapes. Generally, those having a cross-linked styrene polymer matrix are in the form of beads, while those having a matrix of a phenol-formaldehyde condensate are granular. The mesh size will generally be between about 10 and 70 mesh although the present invention is not limited to any particular mesh size.

Other suitable treating agents are the alkali metal carbonates such as sodium, lithium and potassium carbonate, sodium carbonate being especially preferred, alkali metal bicarbonates such as sodium, lithium and potassium bicarbonate and ammonium hydroxide.

The contacting contemplated by the present invention can be accomplished in several different ways. For example, the scintillator compositions or liquid vehicles can be slurried with the solid treating agents, percolated through beds of the solid treating agents, or the compositions or vehicles can be stored together with the liquid or solid treating agents. When the treating agent used is one of the basic ion-exchange resins, the percolation method wherein the scintillator composition or liquid vehicle is passed through a bed of the particular resin is preferred. The percolation method is most conveniently carried out by packing a suitable column with the resin and allowing the liquid scintillator composition or liquid vehicle to pass through the column. The length of the column used can vary over wide limits provided it has sufficient capacity to reduce the chemiluminescence to an acceptable background level. In general, the size of the columns used is groverned strictly by the volume of scintillator composition or liquid vehicle sought to be treated. If, for example, it is desired to carry out a large scale commercial process, columns of extremely large capacity can be used, whereas if smaller scale operations are being employed, much smaller columns can be used. The flow rate of the liquid scintillator composition or liquid vehicle through the column can also vary over rather wide limits depending on the size of the column used. The percolation method can also be advantageously employed when the treating agent used is an alkali metal carbonate or bicarbonate. The same considerations discussed above in using columns of the basic ion-exchange resins apply in the case of using columns of the above mentioned carbonates or bicarbonates.

The contacting of the present invention can also be carried out by slurrying the liquid compositions or liquid vehicles with the solid treating agents. This, of course, can be done by many different techniques such as simply shaking a mixture of the treating agent and the liquid composition or liquid vehicle or merely stirring the heterogeneous system. The slurrying method is particularly desirable when alkali metal carbonates or bicarbonates are used as the treating agent. The amount of the solid treating agent slurried with the compositions or vehicles is not critical and need only be in an amount effective to reduce the chemiluminescence to the desired acceptable background level for the particular measurement being made. Generally, however, amounts of the solid treating agents ranging from 1 to 10 percent by weight of the combined weight of solid treating agent and scintillator composition or liquid vehicle will be employed. As will be obvious, the larger the amount of treating agent employed, the less contact time will be required to attain desirable background levels. For example, if large quantities ($<15\%$ by weight) of the solid treating agent are employed, contact times as short as 30 seconds are sufficient to render the scintillator compositions suitable for counting low activity basic materials, e.g., tritium-containing materials. It should be pointed out that treatment either by the precolation method or the slurrying method with the solid treating agents does not render the scintillator compositions permanently free from chemiluminescent reaction when a basic sample is added. It has been found that the scintillator compositions which have been themselves treated or scintillator compositions made from the treated liquid vehicles will undergo chemiluminescent reaction if they have been allowed to stand too long after treatment. If it is desired, therefore, to maintain the scintillator composition more or less permanently free from any chemiluminescent reaction, it is desirable to store the liquid scintillator composition together with a certain amount of one or more of the treating agents. Alternately, of course, the liquid vehicles, i.e., the aromatic hydrocarbon solvent and ethoxylated alkyl phenol can be stored with the treating agents until ready for use in preparing the scintillator compositions. When storing is used, the amount of treating agent can range from 0.1 to 10 percent by weight of the combined treating agent and scintillator composition or liquid vehicle.

The method of the present invention can also be carried out by mixing from 0.1 to 5 weight percent of concentrated ammonium hydroxide with the liquid scintillator composition or liquid vehicle. The presence of the ammonium hydroxide does not interfere with subsequent measurements wherein a basic material is added. Obviously, only the storing method of contacting can be employed when ammonium hydroxide is used as the treating agent inasmuch as the ammonium hydroxide is a liquid.

The invention is illustrated by the following examples which are not intended to limit the scope thereof. The ethoxylated alkyl phenol used in all examples was an ethoxylated nonyl phenol having an average of 9.2 ethoxy groups per molecule and a $n/x$ ratio of 1.02.

EXAMPLE 1

A 10-ml. quantity of a liquid scintillator composition comprised of 63.3% (vol.) xylene, 36.7% (vol.) ethoxylated nonyl phenol, 0.55% (wt./vol.) PPO and .24% (wt./vol.) MSB was mixed with 2 ml. of distilled water. The homogeneous mixture had an initial counting rate of 1.20 counts/second which did not change upon standing for extended periods.

EXAMPLE 2

Ten ml. of the liquid scintillator composition of Example 1 was mixed with 2 ml. of 0.1 N NaOH. The homogeneous mixture had an initial counting rate of 60,000 counts/second which diminished after one hour to 1250 counts/second and after 48 hours to 1.66 counts/second.

EXAMPLE 3

A portion of the liquid scintillator composition of Example 1 was passed through a bed of a strong-base ion-exchange resin containing quarternary ammonium groups as the functional groups. The resin bed consisted of a 1 in. x 8 in. column of the resin. A flow rate of ca. 1 ml./minute was maintained. Ten ml. of the liquid scintillator composition which had been passed through the resin bed was mixed with 2 ml. of 0.1 N NaOH. The homogeneous mixture gave an initial counting rate of 2 counts/second which decreased within 5 minutes to $<1.3$ counts/second.

EXAMPLE 4

Ten ml. of the liquid scintillator composition used in Example 1 containing 1 percent by weight concentrated ammonium hydroxide was mixed with 2 ml. of 0.1 N NaOH. The homogeneous mixture had an initial counting rate of about 5 counts/second which rapidly decayed to a normal background level of $<1.3$ counts/second.

EXAMPLE 5

The liquid scintillator composition used in Example 1 was slurried with 5 percent by weight of sodium carbonate for 16 hours. Ten ml. of the thus treated liquid scintillator composition was mixed with 2 ml. of 0.2 N NaOH. The homogeneous mixture had an initial counting rate of 4 counts/second which within 5 minutes had decayed to a normal background rate of <1.3 counts/second.

EXAMPLE 6

The liquid scintillator composition of Example 1 was stored three months together with 5 percent by weight of sodium carbonate. Following the 3-month storage period, a homogeneus mixture of a 10-ml. sample of the liquid scintillator composition and 2 ml. of 0.1 N NaOH gave an initial counting rate of ca. 3 counts/second which rapidly decayed to <1.3 counts/second.

As the above examples clearly demonstrate, the treating method of the present invention is extremely effective in rendering the liquid scintillator compositions suitable for use in counting basic materials.

What is claimed is:

1. A method for reacting a liquid scintillator composition comprising contacting a composition comprising an aromatic hydrocarbon, a scintillation solute and an ethoxylated alkyl phenol wherein the alkyl substituent contains from 7 to 16 carbon atoms and the ratio of the number of carbon atoms in said alkyl substituent to the average number of ethoxy groups in said ethoxylated alkyl phenol is from 0.83 to 1.67, with an effective amount of a treating agent selected from the group consisting of basic ion-exchange resins, alkali metal carbonates, alkali metal bicarbonates, ammonium hydroxide and mixtures thereof, said contacting being carried out for a period of time sufficient to reduce the chemiluminescence to an acceptable background level when a basic material is added to said composition.

2. The method of claim 1 wherein said aromatic hydrocarbon is xylene and the ratio of xylene to said ethoxylated alkyl phenol is from 3:1 to 1:1.

3. The method of claim 2 wherein said scintillation solute is present in an amount of from 1 to 12 g./liter and is comprised of a fluor and a wave-band shifter.

4. The composition of claim 3 wherein said scintillation solute comprises 2,5-diphenyloxazole and p-bis-(O-methyl-styryl)-benzene.

5. The method of claim 4 wherein said contacting is accomplished by passing said composition through a bed of said treating agent.

6. The method of claim 5 wherein said treating agent is a basic ion-exchange resin.

7. The method of claim 5 wherein said treating agent is an alkali metal carbonate.

8. The method of claim 7 wherein said alkali metal carbonate is sodium carbonate.

9. The method of claim 4 wherein said contacting is accomplished by mixing together said composition with said treating agent.

10. The method of claim 9 wherein said treating agent is a basic ion-exchange resin.

11. The method of claim 9 wherein said treating agent is an alkali metal carbonate.

12. The method of claim 11 wherein said alkali metal carbonate is sodium carbonate.

13. The method of claim 4 wherein said contacting is accomplished by storing said composition in contact with said treating agent.

14. The method of claim 13 wherein said treating agent is a basic ion-exchange resin.

15. The method of claim 13 wherein said treating agent is an alkali metal carbonate.

16. The method of claim 15 wherein said alkali metal carbonate is sodium carbonate.

17. A method for treating a liquid vehicle used in preparing liquid scintillator compositions comprising contacting a liquid vehicle comprised of an aromatic hydrocarbon and an ethoxylated alkyl phenol wherein the alkyl substituent contains from 7 to 16 carbon atoms and the ratio of the number of carbon atoms in said alkyl substituent to the average number of ethoxy groups in said ethoxylated alkyl phenol is from 0.83 to 1.67, with an effective amount of a treating agent selected from the group consisting of basic ion-exchange resins, alkali metal carbonates, alkali metal bicarbonates, ammonium hydroxide and mixtures thereof, said contacting being carried out for a period of time sufficient to reduce the chemiluminescence to an acceptable background level when a basic material is added to a liquid scintillator composition prepared from said liquid vehicle.

18. The method of claim 17 wherein said aromatic hydrocarbon is xylene and the ratio of xylene to said ethoxylated alkyl phenol is from 3:1 to 1:1.

19. The method of claim 18 wherein said contacting is accomplished by passing said liquid vehicle through a bed of said treating agent.

20. The method of claim 19 wherein said treating agent is a basic ion-exchange resin.

21. The method of claim 19 wherein said treating agent is an alkali metal carbonate.

22. The method of claim 21 wherein said alkali metal carbonate is sodium carbonate.

23. The method of claim 18 wherein said contacting is accomplished by mixing together said liquid vehicle with said treating agent.

24. The method of claim 23 wherein said treating agent is a basic ion-exchange resin.

25. The method of claim 23 wherein said treating agent is an alkali metal carbonate.

26. The method of claim 25 wherein said alkali metal carbonate is sodium carbonate.

27. The method of claim 18 wherein said contacting is accomplished by storing said liquid vehicle in contact with said treating agent.

28. The method of claim 27 wherein said treating agent is a basic ion-exchange resin.

29. The method of claim 27 wherein said treating agent is an alkali metal carbonate.

30. The method of claim 29 wherein said alkali metal carbonate is sodium carbonate.

References Cited

UNITED STATES PATENTS 2,492,955   1/1950   Ballard et al. _____ 260—615

OTHER REFERENCES

Williams et al.: International Atomic Energy Agency Symposium, Monaco, Mar. 2–10, 1967, pp. 703–9.

Benson R. H.: Anal. Chem. 38 (1966), pp. 1353–6.

TOBIAS E. LEVOW, Primary Examiner

A. P. DEMERS, Assistant Examiner

U.S. Cl. X.R.

250—71, 71.5, 83, 83.1; 260—612